United States Patent [19]

Kameyama et al.

[11] Patent Number: 4,829,217

[45] Date of Patent: May 9, 1989

[54] DEVICE FOR CONTROLLING MOVEMENT OF A ROTATING ELEMENT

[75] Inventors: Toru Kameyama, Tokyo; Ken Miyagi, Yokohama, both of Japan

[73] Assignee: Canon Kabushiki Kaisha, Tokyo, Japan

[21] Appl. No.: 856,501

[22] Filed: Apr. 28, 1986

Related U.S. Application Data

[63] Continuation of Ser. No. 541,699, Oct. 13, 1983, abandoned.

[30] Foreign Application Priority Data

Oct. 15, 1982 [JP] Japan ................................ 57-179958

[51] Int. Cl.[4] ................................................ H02P 7/68

[52] U.S. Cl. ........................................ 318/51; 318/53; 318/67; 318/37; 318/41

[58] Field of Search ........................ 318/41, 50, 51, 53, 318/59, 63, 66, 327, 463, 464, 563, 565, 35, 45, 46, 49, 67, 37; 361/23; 355/8, 14 R, 3 DR; 74/22 R

[56] References Cited

U.S. PATENT DOCUMENTS

| | | | |
|---|---|---|---|
| 2,418,134 | 4/1947 | Mitchell | 318/41 |
| 3,497,778 | 2/1970 | Gerber | 318/46 X |
| 3,832,616 | 8/1974 | Vinner | 318/67 X |
| 4,169,681 | 10/1979 | Kato | 74/22 R X |
| 4,186,619 | 2/1980 | Nissen et al. | 74/22 R X |
| 4,425,036 | 1/1984 | Kameyama et al. | 74/22 R X |
| 4,426,149 | 1/1984 | Kuemmel et al. | 355/14 R X |

FOREIGN PATENT DOCUMENTS

| | | | |
|---|---|---|---|
| 55-22264 | 2/1980 | Japan | 318/41 |
| 1035717 | 8/1983 | U.S.S.R. | 318/34 |

*Primary Examiner*—Bentsu Ro

*Attorney, Agent, or Firm*—Fitzpatrick, Cella, Harper & Scinto

[57] ABSTRACT

A safety device for use in a recording apparatus controls the on/off operation and prevents the malfunction of motors for driving a gear flange to rotate a light sensitive drum and for driving an actuating gear and other driving members in accordance with a signal indicative of the reference rotational frequency received from an oscillator and a signal indicative of the rotational frequency of each motor. A motor control circuit is used including motor drivers for controlling the operation of said motors and a fault detection circuit for detecting the malfunction of said motors by comparing an adder output indicative of said motors' rotational frequencies with threshold values in a comparator, thereby ascertaining the long-term use of the light sensitive drum.

15 Claims, 6 Drawing Sheets

DEVICE FOR CONTROLLING MOVEMENT OF A ROTATING ELEMENT

This is a continuation of application Ser. No. 541,699, filed Oct. 13, 1983, now abandoned.

BACKGROUND OF THE INVENTION

1. Field of the Invention

The present invention relates to a safety device for use in recording apparatuses such as copiers, laser beam printers and the like.

2. Description of the Prior Art

Conventionally, in such a device, for example, an electrophotograph recording device has suffered from a problem since a cleaner blade, for removing toner remaining on a light sensitive drum after transfer, is pressed into contact with a drum face. The relative position of the cleaner blade is fixed on the light sensitive drum in a direction of the axis of the drum so that the same portion of the light sensitive drum is always rubbed and a scratch in the light sensitive drum may be gradually enlarged due to a scratch in the cleaner blade or due to foreign matter lodged between the cleaner blade and the light sensitive drum, thereby accelerating the deterioration of the light sensitive drum.

Likewise, a conventional laser beam printer (LBP) has suffered from a problem that the continuous and repetitive printing of the same format results in memorizing the pattern of the format in a light sensitive layer because a light sensitive drum is fixed in the axial direction thereof and hence the previous format is thinly printed for a while even after the format has been changed.

SUMMARY OF THE INVENTION

An object of the present invention is to eliminate the above mentioned drawbacks associated with the conventional devices.

Another object of the present invention is to provide a safety device for preventing fatigue and deterioration of rotating elements such as a light sensitive drum and the like to ensure a long term use of the rotating element.

Another object of the present invention is to provide a highly reliable safety device.

Another object of the present invention is to provide a safety device capable of detecting malfunction of a driving source and the like with a simple structure.

A further object of the present invention is to provide a safety device capable of providing a reproduced image of high quality.

Other objects of the present invention will be apparent from the following description in conjunction with the accompanying drawings and the appended claims.

DETAILED DESCRIPTION OF THE PREFERRED EMBODIMENT

The present invention will be described in detail hereinbelow with reference to the accompanying drawings.

Figure 1:
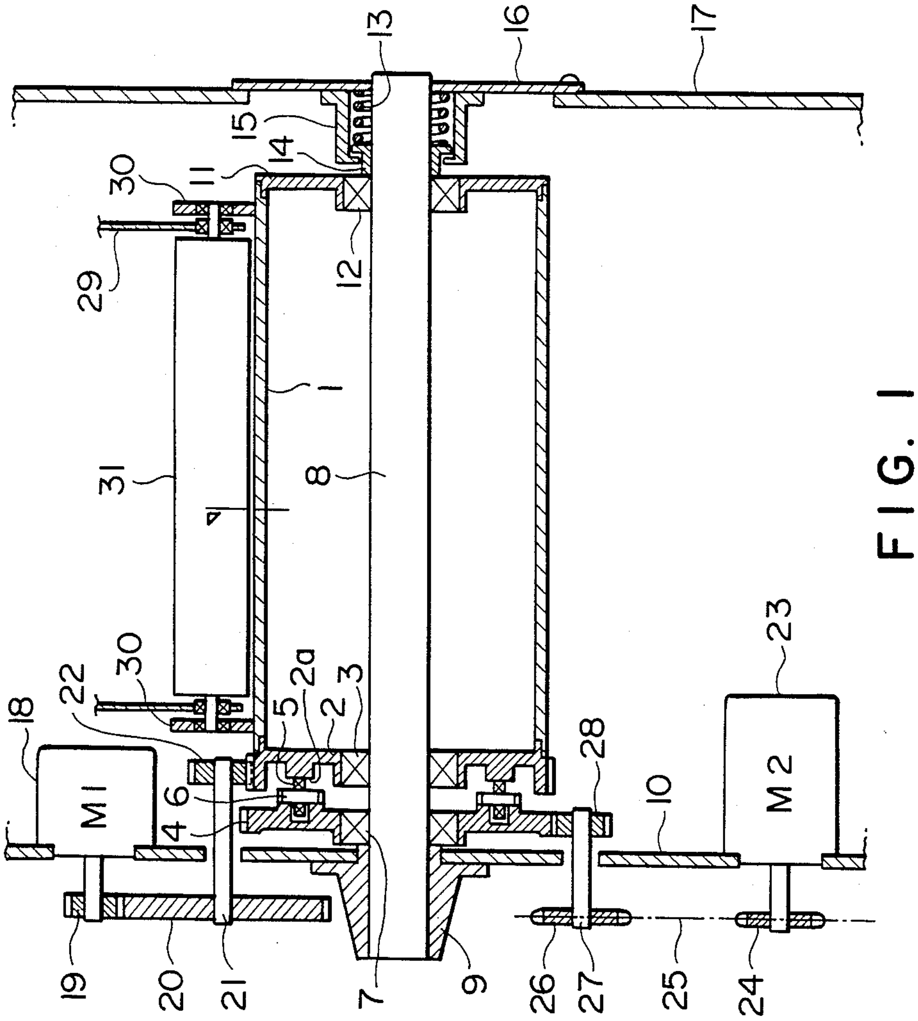
FIG. 1 is a sectional view illustrating an exemplary arrangement of a rotating element driving device to which the present invention can be applied.

FIG. 1 shows an example of the arrangement of a rotating element driving device to which the present invention can be applied, in which 1 is a light sensitive drum, 2 is a gear flange with a cam face *2a* formed on one side thereof, and a ball bearing 3 is pressed into the inner circumference of the gear flange 2 and the light sensitive drum is fitted into the outer circumference of the gear flange 2. 4 is an actuating gear and a ball bearing 5 is provided on an end face of the actuating gear 4 on the side of the gear flange 2. The outer ring portion of the ball bearing 5 is brought into contact with the cam face *2a* to form a cam mechanism paired with the cam face 2a in such a manner that the ball bearing 5 can rotate on a shaft 6 which is fixed to the end face of the actuating gear 4. Another ball bearing 7 is pressed into the inner circumference of the actuating gear 4. 8 is a drum shaft for supporting the light sensitive drum 1, which is fixed to a left-hand frame 10 of the body through a bearing 9. At an end of the light sensitive drum 1 in opposition to the gear flange 2, another flange 11 is fitted and a ball bearing 12 is pressed into the inner circumference of the flange 11. 13 is a compression ring for urging the cam face *2a* against the outer ring portion of the ball bearing 5 by pushing the light sensitive drum 1 in the left-hand direction of the drawing through a collar 14. 15 is a housing for enclosing the compression spring 13 and the collar 14 and fixed to a centering plate 16. 17 is a body right-hand frame to which the centering plate 16 is fixed. The spring force of the compression spring 13 is received by the right end face of the bearing 9 against which an end face of the inner ring portion of the ball bearing 7 abuts through the ball bearing 12, the light sensitive drum 1, the cam face *2a*, the ball bearing 5 and the ball bearing 7.

Next, the driving mechanism will be described. 18 is a first motor (M1) for rotating the light sensitive drum 1 to drive the gear flange 2 which is in integral with the light sensitive drum 1 through gears 19 and 20, a gear shaft 21 and a gear 22. 23 is a second motor (M2) for driving the actuating gear 4 and other driving members such as a paper feed roller, a fixing roller and a developing roller (not shown), which is adapted to drive the actuating gear 4 through a sprocket 24, a chain 25, a sprocket 26, a sprocket shaft 27 and a gear 28. The motor 18 for driving the light sensitive drum 1 is separately provided by reason that if the light sensitive drum 1 is driven by the motor 23 for driving other driving members, the fluctuating load of the other driving members is transmitted to the light sensitive drum 1 through the driving system to cause the irregular rotation of the light sensitive drum 1, thereby adversely affecting the quality of the image formed on the light sensitive drum 1.

Figure 2:
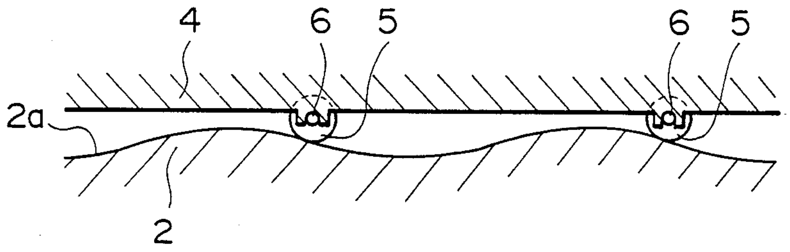
FIG. 2 is an exploded view of a cam mechanism arrangement of the rotating element driving device in FIG. 1 in the circumferential direction.

FIG. 2 is a circumferentially exploded view of a portion of the cam mechanism in FIG. 1. In the drawing, the cam face 2a is in the form of an uneven sine curve of two periods and the pair of ball bearings 5 are provided in the opposite positions displaced 180° from each other so as to be in abutment on the cam face 2a. The rotational frequencies of the first motor (M1) 18 and the second motor (M2) 23, the number of teeth of the gears 19 to 22 and 28 and the number of teeth of the sprockets 24 and 26 are determined so that the rotational frequency of the gear flange 2 having the cam face 2a is slightly different from that of the actuating gear 4 having the ball bearings 5 by predetermined rotations. Now, as the motor (M1) 18 for driving the gear flange 2 rotates simultaneously with the rotation of the motor (M2) 23 for driving the actuating gear 4, the two ball bearings 5 move slowly along the circumference of the cam face 2a and the light sensitive drum 1 reciprocatingly moves in the axial direction after the configuration of the sine curved cam face 2a. Here, supposing that the actuating gear 4 deviates by the amount corresponding to 1/200 the rotation during one revolution of the light sensitive drum 1, the light sensitive drum 1 will reciprocatingly move in the axial direction at a rate of one time per 100 revolutions. In addition, supposing that the light sensitive drum is 200 mm in diameter, it will periodically repeat the reciprocating motion at a rate of one time per about 250 sheets when feeding output papers (recording papers) which are cut into the A4 size n a direction of their shorter dimension.

In order to separately drive the two members 2 and 4 constituting the cam mechanism with the use of the two motors 18 and 23 as mentioned above, it is necessary to start and stop the motors 18 and 23 at the same timing by reason that if the motors 18 and 23 are started and stopped at the different timings, one motor will rotate while the other motor is stopping, as a result of which the ball bearings 5 will rapidly move on the cam face 2a at the rotating speed of the light sensitive drum 1 or the actuating gear 4 to cause the light sensitive drum 1 to make the axial reciprocating motion of an extremely short cycle, for example, at a rate of two cycles per one revolution. If a reciprocating motion of such an extremely short cycle occurs, the surface of the light sensitive drum 1 will be severely rubbed with the outer peripheral face of a roller 30 of a developer 29 in FIG. 1 in the axial direction and possibly damaged, and the failure and abrasion of the related various components of the mechanism such as the deterioration of the cam face 2a and the ball bearings 5 and the abrasion of the bore faces of the inner ring portions of the ball bearings 3 and 12 will be accelerated. The roller of the developer 29 is used to constantly leave a minute space Δ between a developing sleeve 31 and the light sensitive drum 1 and the outer peripheral face of the roller 30 is usually forced on the surface of the light sensitive drum 1 with suitable load and hence the roller rotates with the rotation of the light sensitive drum 1 in contact therewith.

Figure 3:
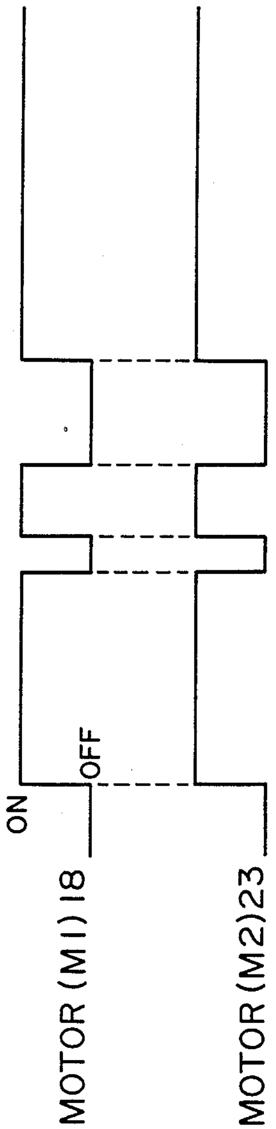
FIG. 3 is a timing chart exemplifying the control operation of the rotating element driving device in FIG. 1.

FIG. 3 shows an example of a driving signal formed in such a manner that the first motor (M1) 18 and the second motor (M2) 23 are caused to start and stop at the same operating timing, in view of the above mentioned matter, that is, one motor is caused to surely rotate during the rotation of the other motor, while one motor is caused to stop during the stopping of the other motor. The occurrence of such an inconvenience as mentioned above can be avoided by controlling the two motors 18 and 23 in synchronism with each other. However, even when the two motors 18 and 23 are controlled as shown in FIG. 3, such a situation will sometimes occur that one motor is stopped due to failure or other unforeseen accidents, while the other motor is rotating. Accordingly, a function for detecting the stopping of any one of the motors to stop the other motor must be added to a motor control circuit. The motor must be stopped not only when the other motor is entirely stopped but also when the rotational frequency of the motor deviates from the specified rotational frequency.

Figure 4:
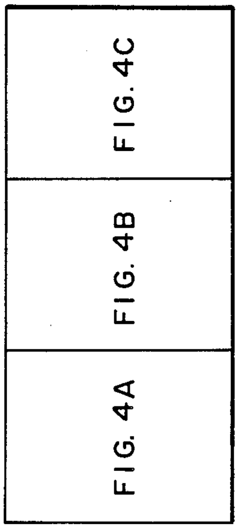
FIG. 4 composed of FIGS. 4A, 4B and 4C shows an example of a control circuit of the rotating element driving device in FIG. 1.

FIG. 4 shows an arrangement example of a control circuit of the rotating element driving device in FIG. 1, especially a control example in which the motors 18 and 23 are tuned to the reference frequency by a phased lock loop (PLL) motor control system. In the drawing, 40 is a first motor driver adapted to drive and control the motor (M1) 18 for rotating the light sensitive drum 1, 50 is a second motor driver adapted to drive and control the motor (M2) 23 for driving the actuating the reference frequency which is referred to when the rotation of the motors 18 and 23 is controlled from an oscillator member such as a quartz oscillator and the like, FG 1 and FG 2 are pulse generators which are directly connected to shafts of the corresponding motors 18 and 23, each of which including an encoder, for example, consisting of a disc having slits and a photointerruptor for generating pulses corresponding to the rotational frequency of the motor. Both the motors 18 and 23 are DC motors, so that the rotational frequency thereof can be freely varied by controlling the voltage applied across a field coil.

Also, WS 1 and WS 2 are waveform shaping circuits for removing the noise contained in the output pulse waveforms from the pulse generators FG 1 and FG 2. PC 1 and PC 2 respectively are phase controllers for comparing and discriminating the phases of the inputted reference frequency from the reference frequency circuit RF and the inputted pulse waveforms from the pulse generators FG 1 and FG 2. The output waveform from the phase controller PC 1 or PC 2 is at a "H" (high) level when the phase of the frequency from the corresponding pulse generator FG 1 and FG 2 is delayed after the phase of the reference frequency from the reference frequency circuit RF or at a "L" (low) level when it is advanced. LPF 1 and LPF 2 are low pass filters adapted to convert the digital waveform signal which is outputted as a result of the phase comparison in the phase controller PC 1 or PC 2 into a DC voltage level signal and remove the noise therefrom. PCR 1 and PCR 2 are phase correction circuits for recovering the phase of a signal component which is remarkably delayed in phase due to the time constant of the low pass filter LPF 1 or LPF 2. AMP 1 and AMP 2 are amplifiers for amplifying the output from the corresponding phase correction circuit PCR 1 or PCR 2 to supply the amplified output to a corresponding switching circuit SW 1 or SW 2 which controls the switching to the rotation/stopping of the corresponding motor 18 or 23. TR 1 and TR 2 are transistors for controlling the rotational frequencies of corresponding motors 18 and 23. The second motor driver 50 is constructed in the same manner as the first motor driver 40 as shown in the drawing and the reference frequency is supplied from the reference frequency circuit RF of the first motor driver 40 to the second motor driver 50 to control the motors 18 and 23 to be tuned to the synchronizing frequency.

Although, in this embodiment, the reference frequency is supplied from the same reference frequency circuit RF to the phase controllers PC 1 and PC 2, alternatively, two reference frequency circuits may be provided and the reference frequency may be supplied to the phase controllers PC 1 and PC 2 from the respective reference frequency circuits.

Next, the operation of the drivers 40 and 50 will be described. As the rotation signal R is applied from a rotation/stopping control signal input terminal P1, it causes the switching circuits SW 1 and SW 2 of the drivers 40 and 50 to conduct, so the voltage is applied across the base terminals of the transistors TR 1 and TR 2 and the motors 18 and 23 begin rotating almost simultaneously. As the pulses generated from the pulse generators FG 1 and FG 2 are applied to the phase controllers PC 1 and PC 2, the "H" level signals are outputted from the phase controllers because the phases of the outputs from the pulse generators initially delay after the phase of the reference frequency, and the outputs pass through the low pass filters LPF 1 and LPF 2 and the phase correction circuits PCR 1 and PCR 2, are amplified in the amplifiers AMP 1 and AMP 2 and supplied to the switching circuits SW 1 and SW 2 and feedback control is exerted to further increase the rotational frequencies of the motors through the transistors TR 1 and TR 2.

As the rotational frequencies of the motors 18 and 23 are further increased and the phases of the pulses generated from the pulse generators FG 1 and FG 2 exceed the phase of the reference frequency, the outputs from the phase controllers PC 1 and PC 2 go to the "L" level and control is exerted to decrease the rotational frequencies of the motors 18 and 23. Such a repetitive control keeps the rotational frequencies of the motors 18 and 23 constant and permits the synchronized starting and operation of the motors 18 and 23. Then, as a stop signal ST is sent from the rotation/stop signal input terminal P1, the switching circuits SW 1 and SW 2 are non-conductive and the control signals of the corresponding transistors TR 1 and TR 2 disappear, by which the motors 18 and 23 are stopped almost simultaneously.

60 is a fault detection circuit including integration circuits INT 1 and INT 2 for integrating the waveforms of the pulses (hereinafter referred to as FG signal) generated from the pulse generators FG 1 and FG 2 of the drivers 40 and 50 and shaped in waveform by the waveform shaping circuits WS 1 and WS 2, an adder ADD for adding the DC levels of the integrated outputs, a comparator CMP for detecting the output level of the adder ADD, and a delay circuit DL for invalidating the output result of the comparator CMP until rotational frequencies of the motors 18 and 23 overcome the inertia of load and reach the specified rotation frequency after the generation of the rotation start signal R. The output of the delay circuit DL is supplied to a second input line L 2 of the switching circuit SW 1 or SW 2. The second input line L 2 is connected with the first input line L 1 in the form of wired OR gate. In this connection, the delay circuit DL applys an output at "H" level to a second input terminal of the switching circuit SW 1 or SW 2 neglecting the output of the comparator CMP until the rotational frequencies of the motors reach the specified rotational frequency after the application of the rotation signal R.

Next, the operation of the fault detection circuit 60 will be described. As the rotation signal R is sent from the input terminal P1, the rotational frequencies of the motors 18 and 23 reach the specified rotational frequency after a predetermined period of time, if the motors operate normally, by which the pulse waveforms of a predetermined period are supplied to the integration circuits INT 1 and INT 2 and hence the integrated outputs Vo 1 and Vo 2 at predetermined DC levels are produced. That is, each of the integration circuits INT 1 and INT 2 produces an output of a value determined in accordance with the frequency of the inputted pulse. The outputs from the integration circuits INT 1 and INT 2 are added in the adder ADD which then produces an integrated output Vo 3 for two circuits. The output level of the integrated output Vo 3 is of a value obtained by adding the DC level outputs Vo 1 and Vo 2. The level of the output Vo 3 is lower than the predetermined level in case that the outputs Vo 1 and Vo 2 are lower than those obtained when the motors 18 and 23 operate at the specified rotational frequency due to the malfunction. The comparator CMP has a threshold level $V_{SL}$ which is used for discriminating the level drop of the output Vo 3 and which is set to the midst between the outputs Vo 3 and Vo 1 (or Vo 2) obtained when the motor operates at the specified rotational frequency. To the contrary, when the rotational frequencies of the motors 18 and 23 are higher than the specified rotational frequency for some reason, the value of the output Vo 3 is higher than the added value of the outputs Vo 1 and Vo 2 obtained when the motors operate at the specified frequency. Therefore, in order to detect the above mentioned phenomenon, the comparator CMP sets a threshold level $V_{SH}$, that is, the upper limit level of the output Vo 3 obtained when the motors operate at the specified frequency. Thus, the comparator CMP produces an output of the given "H" level, that is, the normal level output $V_N$, upon the normal rotation of the motors or produces an output of the "L" level upon the abnormal operation of the motors. Although in this embodiment, the adder ADD is used, a subtracter may be used to compare the subtracted value with the specified value, instead.

As has been mentioned above, as the rotation signal R is supplied, the delay circuit DL of the fault detection circuit 60 actuates to neglect the output of the comparator CMP for a predetermined period of time until the rotational frequencies of the motors 18 and 23 reach the specified rotational frequency and to cause the switching circuits SW 1 and SW 2 of the driver circuits 40 and 50 to conduct, thereby increasing the rotational frequencies of the motors 18 and 23. The motors 18 and 23, when they reach the specified rotational frequency, are kept at the constant rotational frequencies under the control of the drivers 40 and 50, so that the output of the comparator CMP goes to the normal "H" level and the "H" level output is applied to the second input terminals of the switching circuits SW 1 and SW 2 through the delay circuit DL. On this occasion, since the switching circuits SW 1 and SW 2 have been already kept conductive by the rotation signal R, the above mentioned input from the fault detection circuit 60 does not act on it. While, if the rotational frequency of any one of the motors 18 and 23 becomes higher or lower than the predetermined rotational frequency and hence an unusual change occurs, the level of the output Vo 3 from the adder ADD will be in excess of or below the reference level $V_{SH}$ or $V_{SL}$ as described above, so that the comparator CMP output drops to the "L" level and the second input terminals of the switching circuits SW 1 and SW 2 of the drivers 49 and 50 go to the "L" level to cause the switching circuits SW 1 and SW 2 to be onon-conductive, resulting in almost simultaneous stopping of the motors 18 and 23.

Figure 6:
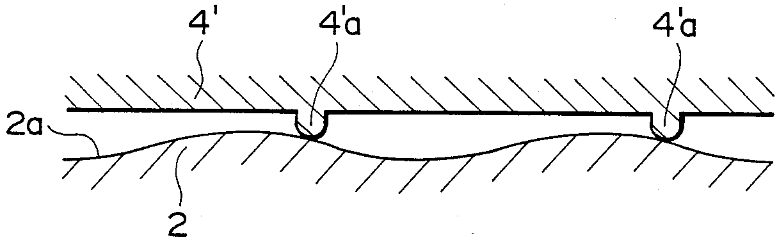
FIG. 6 is an exploded view illustrating the cam mechanism arrangement of the rotating element driving device in FIG. 5 exploded in the circumferential direction.
Figure 5:
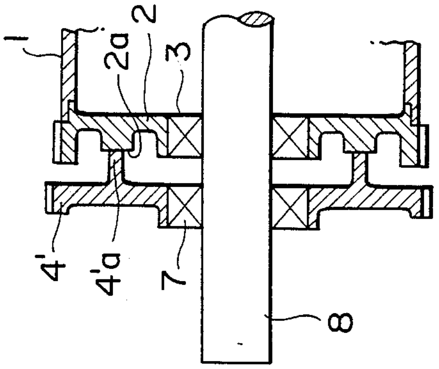
FIG. 5 is a sectional view of the main portion of a cam mechanism in another embodiment of the rotating element driving device.
Figure 4A:
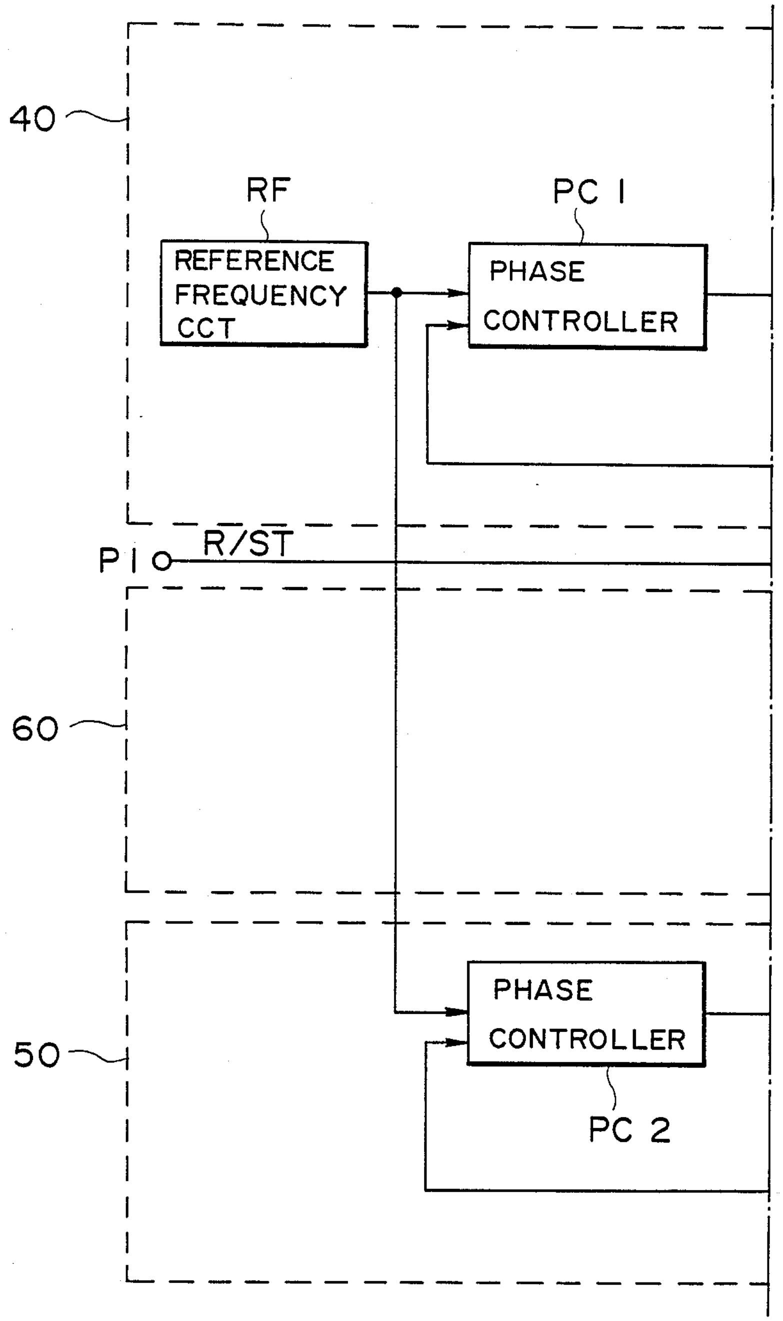
Figure 4B:
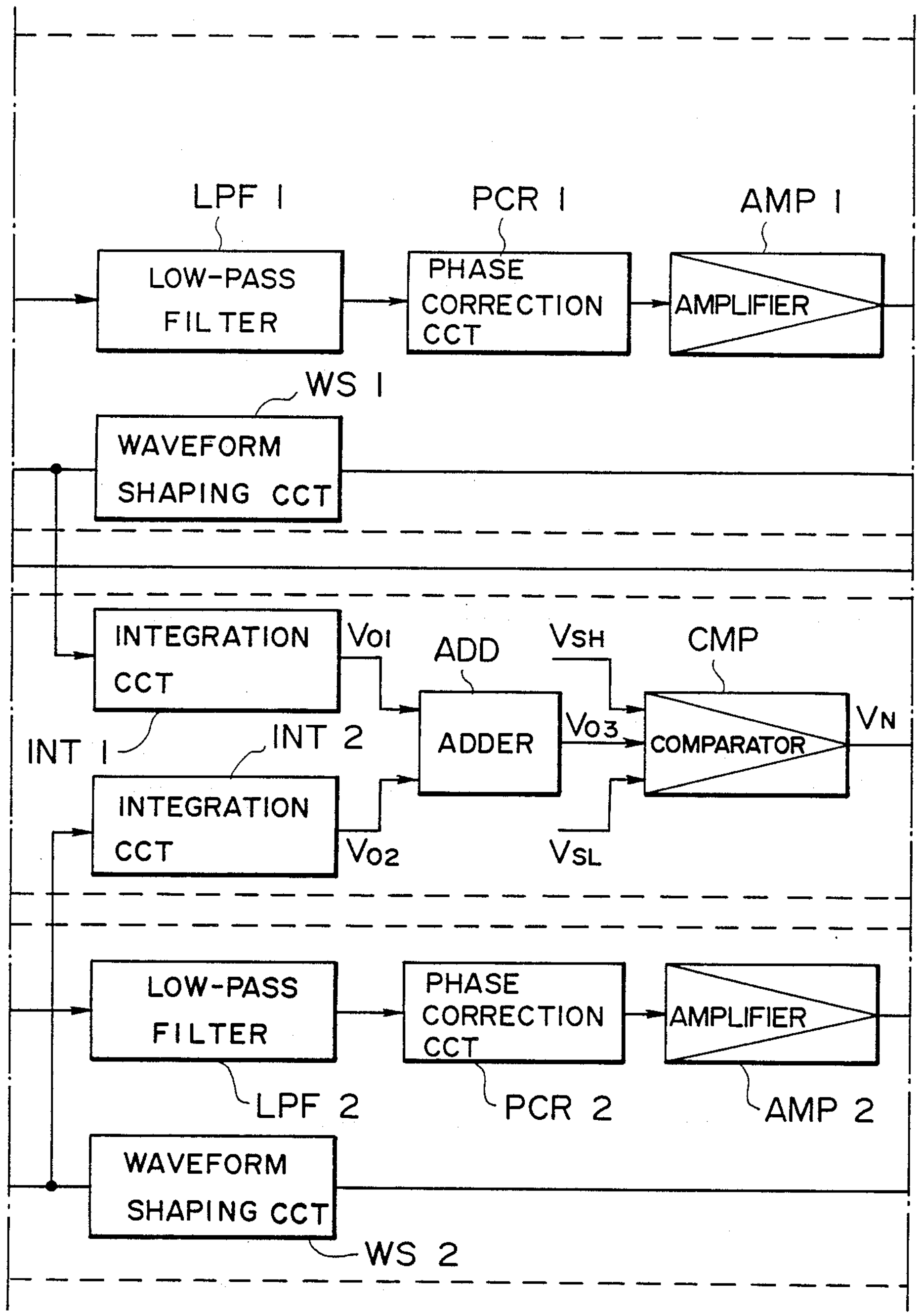
Figure 4C:
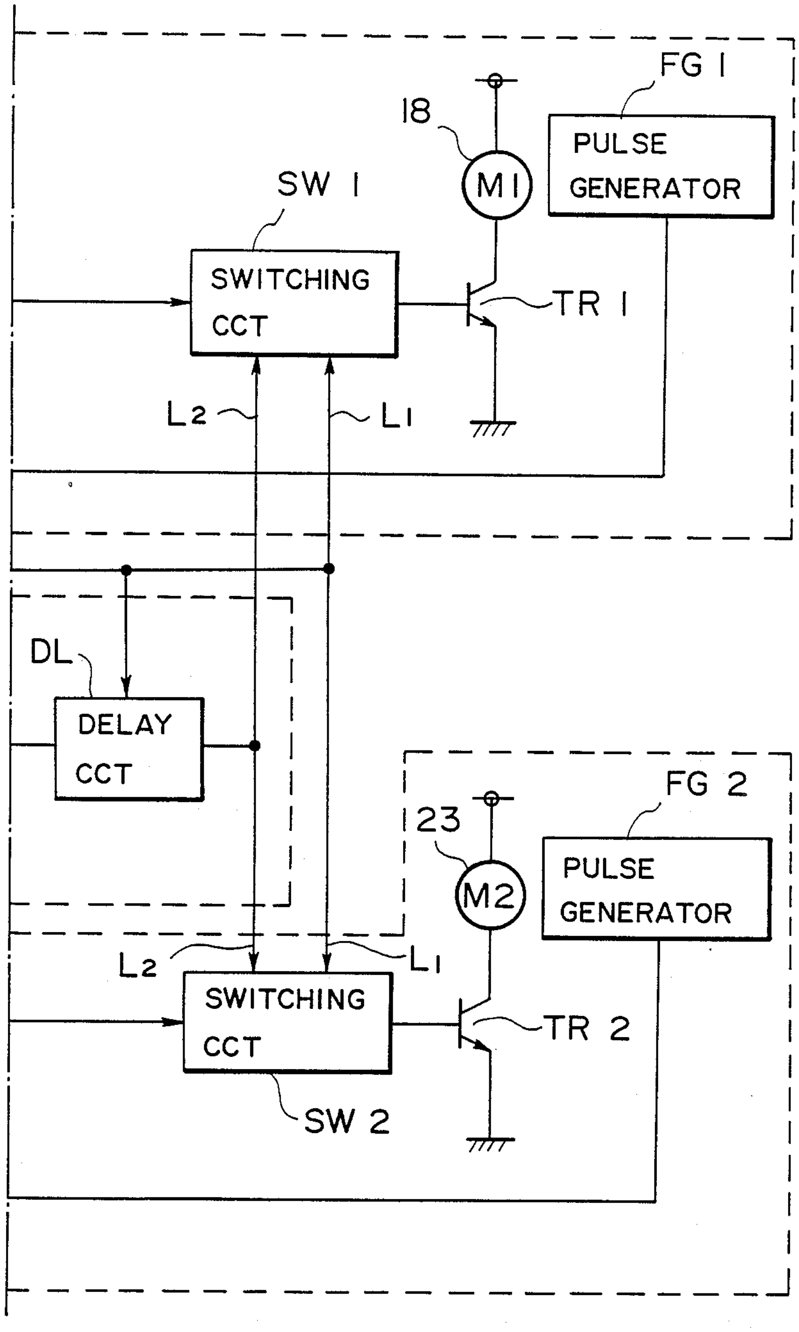

In this connection, the cam mechanism in this embodiment is not limited to the configuration as shown in FIG. 1, other arrangements may be used. FIG. 5 shows another example of the cam mechanism, in which a protrusion 4' a formed on an actuating gear 4' is substituted for the ball bearing 5 of the actuating gear 4 in FIG. 1 and the tip of the protrusion 4' *a* is slided into contact with the cam face 2*a*. FIG. 6 shows a portion of the cam mechanism in FIG. 5 exploded in the circumferential direction. In addition to the cam mechanism so constructed as to move in the circumferential direction relative to the motion of the light sensitive drum 1 as mentioned above, a cam mechanism of such a configuration as to directly move the drum 1 in the axial direction may be used.

Further, although this embodiment is designed in such a manner that the motors 18 and 23 are directly turned on or off to rotate or stop the light sensitive drum 1 and the actuating gear 4 almost simultaneously, in case that the motor 23 or 18 also drives other loads and it is not intended to stop the other loads, a clutch (not shown) may preferably be provided between the actuating gear 4 and the driving motor 23 or between the light sensitive drum 1 and the driving motor 18 to start or stop the light sensitive drum 1 or the actuating gear 4 under the on/off operation of the clutch.

As has been mentioned above, according to the present invention, the life of the rotating element can be prolonged by reducing the occurrence of flaws in the rotating element surface and the rotating element driving device which is capable of preventing a pattern's after image from being left on, for example, the laser beam printer can be realized with safety and high reliability.

While the present invention has been described in terms of the preferred embodiments, it is to be understood that the present invention is not limited thereto and that various changes and modifications may be made without departing from the scope of the following claims.

What we claim is:

1. A rotating element control device comprising:

a first driving source for rotating and driving a rotatable photosensitive member in a circumferential direction at a predetermined speed;

a cam member for moving said rotatable photosensitive member in an axial direction of said rotatable photosensitive member;

a second driving source for driving said cam member; and controlling means including means for discriminating the driving states of said first and second driving sources and means for controlling the operation of said first and second driving sources.

2. The device according to claim 1, wherein said controlling means includes means for turning off both of said first and second driving sources when at least one of said first and second driving sources is in a predetermined state.

3. The device according to claim 2, wherein said first and second driving sources each include a motor.

4. The device according to claim 3, wherein said turning off means turns off both of said first and second motors when the speed of at least one of said first and second motors is out of a predetermined range.

5. A rotating element control device comprising:

a first motor for rotating and driving a rotating element;

a second motor for driving a member associated with said rotating element to move said rotating element in an axial direction thereof; and controlling means for controlling said first and second motors so that both of said first and second motors turn on substantially simultaneously and turn off substantially simultaneously, wherein said controlling means turns off both of said first and second motors when the speed of at least one of said first and second motors is out of a predetermined range.

6. A rotating element control device comprising:

a first motor for rotating and driving a rotating element;

a second motor for driving a member associated with said rotating element to move said rotating element in an axial direction thereof; and controlling means for controlling said first and second motors so that both of said first and second motors turn on substantially simultaneously and turn off substantially simultaneously, wherein said controlling means controls said first and second motor so that when one of said first and second motors is stopped, the other thereof is stopped.

7. A rotating element control device, comprising:

a first driving source for rotating and driving a rotating element;

a second driving source for driving a member associated with said rotating element to move said rotating element in an axial direction thereof; and controlling means for controlling said first and second driving sources to that both of said first and second driving sources turn on substantially simultaneously and turn off substantially simultaneously, wherein said controlling means includes first and second encoders coupled to said first and second driving sources, respectively, for controlling the operation of each said driving source by means of signals from said encoders and a signal from a reference oscillator.

8. An operating state discriminating device comprising:

first driving means for driving a load in a first direction;

first producing means for producing a first state signal in accordance with an operating state of said first driving means;

second driving means for driving said load in a second direction different from said first direction;

second producing means for producing a second state signal in accordance with an operating state of said second driving means;

means for performing an operation on said first and second state signals, and means for outputting an abnormal signal in accordance with the operational results of said operations on said first and second state signals, said outputting means outputting the abnormal signal when the operational result is in a range greater than a first reference value and less than a second reference value.

9. The device according to claim 8, wherein said performing means includes means for adding said first and second state signals.

10. The device according to claim 8, wherein said first driving means is a first motor adapted to rotate and drive said load, and said second driving means is a second motor adapted to drive a member associated with said load to move said load in said second direction.

11. The device according to claim 10, wherein said member includes a cam element for transferring said rotating load in an axial direction.

12. The device according to claim 11, wherein said rotating load is a photosensitive member for recording an image thereon.

13. The device according to claim 8, wherein said outputting means produces the abnormal signal when the operational result of said performing means is out of a predetermined range.

14. The device according to claim 8, further comprising control means for controlling said first and second driving means so as to turn off simultaneously in accordance with said abnormal signal.

15. A rotating element control device comprising:

a first motor for rotating and driving a rotating element;

a second motor for driving a member associated with said rotating element to move said rotating element in an axial direction thereof; and controlling means for controlling said first and second motors so that both of said first and second motors turn on substantially simultaneously and turn off substantially simultaneously, wherein said controlling means includes first detecting means for detecting an operating condition of said first motor and second detecting means for detecting an operating condition of said second motor, and said first and second motors are controlled in accordance with outputs from said first and second detecting means, respectively.

* * * * *